United States Patent
Hayashi

(10) Patent No.: US 8,783,225 B2
(45) Date of Patent: Jul. 22, 2014

(54) INTAKE DEVICE FOR INTERNAL COMBUSTION ENGINE

(75) Inventor: Hideki Hayashi, Kariya (JP)

(73) Assignee: Denso Corporation, Kariya (JP)

(*) Notice: Subject to any disclaimer, the term of this patent is extended or adjusted under 35 U.S.C. 154(b) by 330 days.

(21) Appl. No.: 13/293,299

(22) Filed: Nov. 10, 2011

(65) Prior Publication Data

US 2012/0192832 A1     Aug. 2, 2012

(30) Foreign Application Priority Data

Jan. 28, 2011  (JP) ................................ 2011-016097

(51) Int. Cl.
 *F02D 9/08* (2006.01)
(52) U.S. Cl.
 USPC .......................................... 123/399; 123/337
(58) Field of Classification Search
 USPC ........... 123/399, 337; 403/345, 355; 251/305, 251/308
 See application file for complete search history.

(56) References Cited

U.S. PATENT DOCUMENTS

| 7,213,557 B2 | 5/2007 | Kondo et al. | |
|---|---|---|---|
| 8,459,895 B2 * | 6/2013 | Hayashi | 403/345 |
| 2007/0017473 A1 | 1/2007 | Kondo et al. | |

FOREIGN PATENT DOCUMENTS

| EP | 2 103 842 | 9/2009 |
|---|---|---|
| GB | 2 393 218 | 3/2004 |
| JP | 2001-248449 | 9/2001 |
| JP | 2003-56646 | 2/2003 |
| JP | 2004-124933 | 4/2004 |
| JP | 2008-157331 | 7/2008 |
| JP | 2008-196706 | 8/2008 |

OTHER PUBLICATIONS

Office Action (2 pages) dated Jan. 29, 2013 issued in corresponding Japanese Application No. 2011-16097 and English translation (3 pages).

* cited by examiner

*Primary Examiner* — Hai Huynh
(74) *Attorney, Agent, or Firm* — Nixon & Vanderhye, P.C.

(57) ABSTRACT

An intake device for an internal combustion engine includes a casing, a valve, a shaft, and an actuator. The casing defines an intake passage, and the valve is contained in the casing. The shaft supports the valve, and the actuator includes a motor, a speed reduction mechanism, and a transmission mechanism which transmits torque of the motor to the shaft from a gear of the speed reduction mechanism. The transmission mechanism includes first and second connection members which are connected to the gear and the shaft respectively, and an impact absorbing member held between the first and second connection members. The first and second connection members respectively include first and second protrusions, which are alternately arranged in a rotational direction of the transmission mechanism. The impact absorbing member includes compressive deformation parts which are deformable in the rotational direction and are respectively located between adjacent first and second protrusions.

20 Claims, 7 Drawing Sheets

INTAKE DEVICE FOR INTERNAL COMBUSTION ENGINE

CROSS REFERENCE TO RELATED APPLICATION

This application is based on and incorporates herein by reference Japanese Patent Application No. 2011-016097 filed on Jan. 28, 2011.

TECHNICAL FIELD

The present invention relates to an intake device for an internal combustion engine, which can generate an intake vortex flow in a combustion chamber of the internal combustion engine.

BACKGROUND

In a conventional intake device for an internal combustion engine (e.g., see JP2001-248449A), a valve, which is provided for opening and closing an intake passage communicating with a combustion chamber of an internal combustion engine, is used as a valving element of a vortex flow control valve. The vortex flow control valve is configured to generate an intake vortex flow such as a tumble flow or a swirl flow in the combustion chamber of the internal combustion engine by shifting an intake air flow toward one side of the intake passage. The intake device for the internal combustion engine includes a housing, the valve, a shaft, and an electrical actuator. The housing defines the intake passage therein, and the valve is rotatably contained inside the housing. The shaft supports and fixes the valve, and the electrical actuator drives the valve in a fully-open direction or a fully-close direction through the shaft.

For example, as shown in FIG. 10A, a speed reduction mechanism of the electrical actuator includes a worm gear (not shown) fixed to an output shaft of a motor, a helical gear 101 meshing with the worm gear, a spur gear 102 located coaxially with the helical gear 101, and an output gear meshing with the spur gear 102. The helical gear 101 and the spur gear 102 are rotatably supported by an outer periphery of a support shaft fixed in the housing. Between the helical gear 101 and the spur gear 102, an impact absorbing member 103 including a rubber elastic body 113 (rubber elastomer) is disposed to rotate integrally with the helical gear 101 and the spur gear 102.

As shown in FIG. 10A, the elastic body 113 is inserted between first and second plates 111 and 112, and is vulcanized-bonded to the first and second plates 111 and 112. The elastic body 113 of the impact absorbing member 103 is twisted in use as shown in FIG. 10B. Thus, a deformation amount of the impact absorbing member 103 increases, so that an impact absorbing performance is ensured.

Therefore, a worm lock can be prevented by a twisting effect of the impact absorbing member 103 when the valve bumps into a fully-close stopper. However, in this case, the number of components and assembly man-hours are large. As a result, production cost becomes high.

Furthermore, as shown in FIG. 10A, because the elastic body 113 as rubber elastomer is vulcanized-bonded to facing surfaces of the first and second plates 111 and 112, the elastic body 113 may be separated from the facing surfaces of the first and second plates 111 and 112. Accordingly, if the elastic body 113 is separated from the facing surfaces of the first and second plates 111 and 112, connection strength between the elastic body 113 and the first plate 111 and between the elastic body 113 and the second plate 112 decreases. Thus, if an impact load operates on the first plate 111 or the second plate 112, twisting power cannot be transmitted to the elastic body 113 held between the first and second plates 111 and 112. As a result, operation reliability decreases.

SUMMARY

The present invention addresses at least one of the above disadvantages.

According to an aspect of the present invention, an intake device for an internal combustion engine includes a casing, a valve, a shaft, and an actuator. The casing defines an intake passage communicating with a combustion chamber of the internal combustion engine. The valve is rotatably contained in the casing to open or close the intake passage, and the shaft supports the valve. The actuator includes a motor as a power source, a speed reduction mechanism which reduces a rotational rate of the motor, and a transmission mechanism which transmits torque of the motor to the shaft from a gear of the speed reduction mechanism. The transmission mechanism includes a first connection member which is integrally and rotatably connected to the gear, a second connection member which is integrally and rotatably connected to the shaft, and an impact absorbing member held between the first connection member and the second connection member. The first connection member includes a plurality of first protrusions, and the second connection member includes a plurality of second protrusions. The first protrusions and the second protrusions are alternately arranged in a rotational direction of the transmission mechanism. The impact absorbing member includes a plurality of compressive deformation parts which are compressively deformable in the rotational direction of the transmission mechanism and are respectively inserted and located between the first and second protrusions that are adjacent to each other in the rotational direction.

According to another aspect of the present invention, an intake device for an internal combustion engine includes a casing, a valve, a shaft, a motor, and a transmission mechanism. The casing defines an intake passage communicating with a combustion chamber of the internal combustion engine. The valve is rotatably contained in the casing to open or close the intake passage. The shaft supports the valve, and the motor is used as a power source. The transmission mechanism transmits torque of the motor to the shaft from a gear of a speed reduction mechanism. The transmission mechanism is configured to have the gear, a rotation member of the shaft, and an impact absorbing member held between the gear and the rotation member. The gear includes a plurality of first protrusions, and the rotation member includes a plurality of second protrusions. The first protrusions and the second protrusions are alternately arranged in a rotational direction of the transmission mechanism. The impact absorbing member includes a plurality of compressive deformation parts which are compressively deformable in the rotational direction of the transmission mechanism and are respectively inserted and located between the first and second protrusions that are adjacent to each other in the rotational direction.

According to the above aspects of the present invention, it is possible to reduce the number of components and assembly man-hours and to decrease production cost. Moreover, a necessary deformation amount of each compressive deformation part of the impact absorbing member for maintaining an impact absorbing performance of twist deformation can be decreased because the impact absorbing member is located near the valve more than the speed reduction mechanism. Therefore, a sufficient impact absorbing performance can be maintained in the impact absorbing member even when the deformation mode is changed from the twist deformation mode to the compressive deformation mode in the rotational direction of the torque transmission mechanism. Furthermore, an impulsive load transmitting to the first connection member or the second connection member or to the gear or the rotation member can be effectively absorbed by the compressive deformation of each compressive deformation part of the impact absorbing member.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE DRAWINGS

Figure 1:
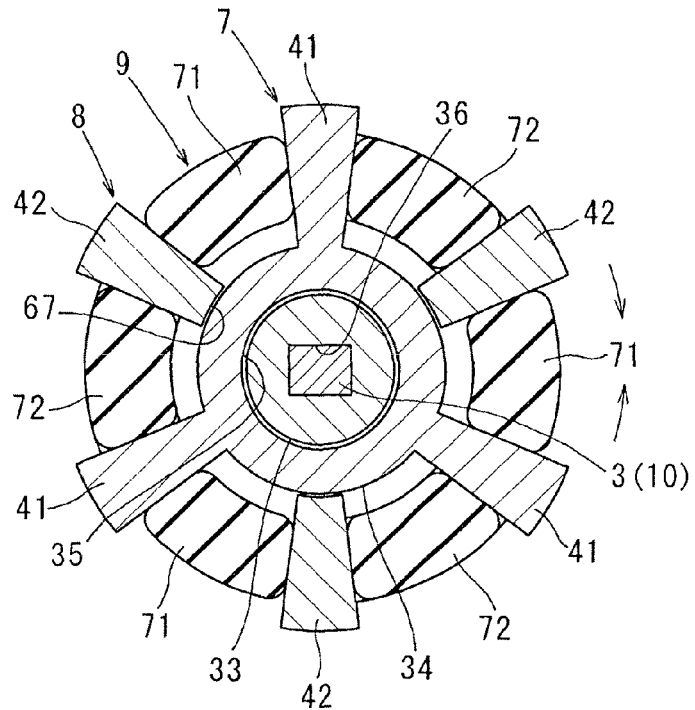
FIG. 1 is a sectional view showing a part of a torque transmission mechanism according to a first embodiment of the invention.

Embodiments of the present invention will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be described with reference to FIGS. 1 to 5.

An intake system of an internal combustion engine (engine) according to the first embodiment has an intake-passage structure in which intake passages are arranged in parallel in an arrangement direction of cylinders of the engine having more than one cylinder. The intake passages respectively supply intake air to cylinders of the engine. The intake system includes an air cleaner, an electronic throttle device, and a vortex flow generating device. For example, the engine is installed in an engine compartment of a vehicle such as an automobile.

Figure 2:
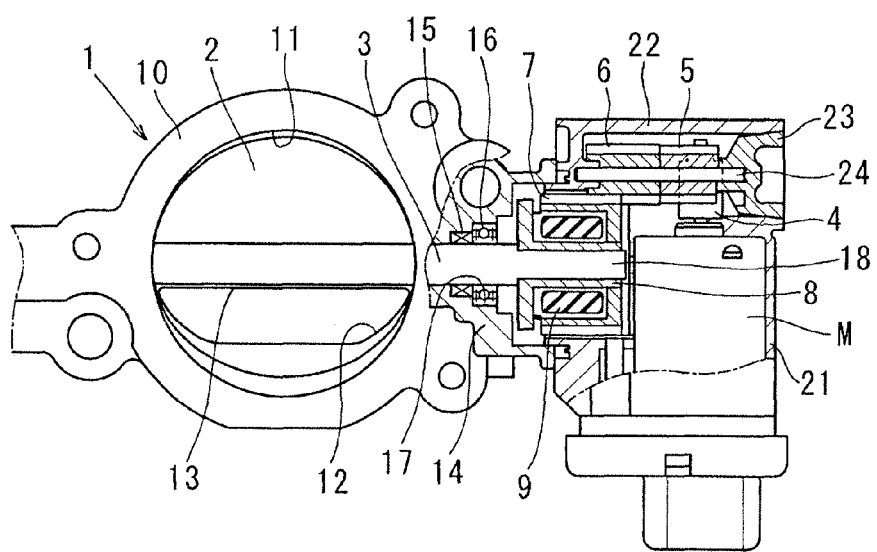
FIG. 2 is a fragmentary sectional view showing an intake device (vortex flow generating device) for an internal combustion engine according to the first embodiment.

As shown in FIG. 2, the vortex flow generating device of the embodiment includes a duct 1 (casing), plate valves 2, a rotary shaft 3, and an electrical actuator. The duct 1 is made of synthetic resin and is incorporated in an intake pipe of the engine. The plate valves 2 are made of synthetic resin and regulate intake air flowing inside the duct 1 by opening or closing of the plate valves 2. The rotary shaft 3 is made of metal and supports the plate valves 2 such that the plate valves 2 can be operatively linked with each other. The electrical actuator causes the plate valves 2 to be opened or closed by rotating the rotary shaft 3. The vortex flow generating device is used as an intake control device of the internal combustion engine, which controls intake air supplied to a combustion chamber of each cylinder of the engine.

The electrical actuator includes a motor M and a power transfer mechanism. The motor M is a power source, and the power transfer mechanism transfers torque of the motor M to the rotary shaft 3. The power transfer mechanism includes a speed reduction mechanism and a torque transmission mechanism. The speed reduction mechanism decreases a rotational rate of the motor M, and the torque transmission mechanism transfers the torque of the motor M from an output gear 7 (last gear, first connection member) of the speed reduction mechanism to the rotary shaft 3.

The speed reduction mechanism includes a worm gear 4, a helical gear 5, a spur gear 6, and the output gear 7. The worm gear 4 is fixed to an output shaft (motor shaft) of the motor M, and the helical gear 5 meshes with the worm gear 4 to rotate. The spur gear 6 is disposed coaxially with the helical gear 5. For example, an axis of the spur gear 6 may be on the same line as an axis of the helical gear 5. The output gear 7 is made of synthetic resin or metal and meshes with the spur gear 6 to rotate. The torque transmission mechanism includes the above-described output gear 7, a joint 8 (second connection member, rotation member), and a cushion 9 (impact absorbing member). The joint 8 is made of synthetic resin or metal and is fixed to the rotary shaft 3 to be able to rotate with the rotary shaft 3 simultaneously, not relatively. The cushion 9 is made of synthetic rubber (elastomer) and is held between the output gear 7 and the joint 8.

The engine has more than one cylinder (e.g., first to fourth cylinders) and includes a cylinder block, in which the first to fourth cylinders are linearly arranged, and a cylinder head having several intake ports and several exhaust ports. The intake ports are respectively connected to the combustion chambers of the cylinders of the engine and are opened or closed by opening or closing poppet-type intake valves. The exhaust ports are respectively connected to the combustion chambers of the cylinders of the engine and are opened or closed by opening or closing poppet-type exhaust valves.

The intake ports are respectively connected to the intake pipes (intake ducts) for supplying intake air to each combustion chamber of the cylinders of the engine. Inside the intake pipe, an intake-air passage is defined for supplying clean outer air, which is filtered through the air cleaner, to each combustion chamber of cylinders of the engine via a throttle body of the electronic throttle device, the surge tank, and an intake manifold (duct 1). The exhaust ports are respectively connected to exhaust pipes (exhaust ducts) for emitting exhaust gas from each combustion chamber of the cylinders of the engine to outside. Inside the exhaust pipe, an exhaust passage is defined for emitting exhaust gas to outside through an exhaust manifold, a rear exhaust pipe, an exhaust purifier, and a muffler.

Spark plugs are attached to the cylinder head of the engine such that end parts of the spark plugs are exposed to insides of the combustion chambers of the cylinders. Injectors (e.g., electromagnetic fuel injection valves), which respectively inject fuel into the intake ports at opportune timing, are also attached to the cylinder head. Inside the cylinder block of the engine, four combustion chambers are arranged in the arrangement direction of the cylinders. In a cylinder bore defined in each cylinder of the cylinder block, a piston is supported slidably in a slide (reciprocation) direction of the piston. The piston is connected to a crankshaft via a connecting rod.

The vortex flow generating device of the embodiment is disposed in the engine compartment of the vehicle. In the vortex flow generating device, a part of a sectional area of each intake passage is closed by each valve 2, so that an intake air flow is shifted to one side of each parallel-arranged intake passage, and a straight flow (lopsided flow) is produced in each intake port of the engine. Accordingly, an intake vortex flow (e.g., a tumble flow or a swirl flow) is generated in each combustion chamber of cylinders of the engine. The vortex flow generating device is incorporated into the intake system with the electronic throttle device. The vortex flow generating device can be adopted as an intake-passage opening/closing device (valve opening and closing device), in which the valves 2 are interlocked with each other and arranged in parallel in regular intervals in a rotation axis direction of the rotary shaft 3 inside the duct 1.

The duct 1 is integrally formed of synthetic resin and is a part of the intake manifold. The duct 1 defines more than one intake passage (independent intake passage) therein. The number of the independent intake passages inside the duct 1 corresponds to the number of the cylinders. The independent intake passages are respectively connected to the intake ports provided in the cylinder head of the engine.

The duct 1 includes plural cylindrical parts more than one (surrounding wall parts) 10 which are positioned at outer peripheries of the independent intake passages respectively. A flange is integrally formed with each cylindrical part 10 at a downstream end portion of each cylindrical part 10 in a flow direction of air. The flange has a coupling end surface to be fastened and fixed to a coupling end surface of the cylinder head by using a fastening bolt or the like. The cylindrical part 10 is elongated in an axis direction of the duct 1 (in an axis direction of the independent intake passage). A bulkhead 13 is integrally formed with each cylindrical part 10 of the duct 1. The bulkhead 13 air-tightly separates the independent intake passage into a first intake passage 11 and a second intake passage 12 in the flow direction of air. In the embodiment, each first intake passage 11 is opened or closed by opening or closing each valve 2.

The duct 1 includes a first holding part 14 on one side of the rotary shaft 3 in the rotation axis direction of the rotary shaft 3. The duct 1 further includes a second holding part (not shown) on the other side of the rotary shaft 3 in the rotation axis direction of the rotary shaft 3. The first holding part 14 defines a first bearing hole 17. The first bearing hole 17 rotatably supports a first sliding part on the one side of the rotary shaft 3 in the rotation axis direction of the rotary shaft 3 via a first bearing member. The first bearing member includes an oil seal 15 and a bearing 16. The second holding part defines a second bearing hole. The second bearing hole rotatably supports a second sliding part on the other side of the rotary shaft 3 in the rotation axis direction of the rotary shaft 3 via a second bearing member (bearing).

The valves 2 are integrally formed of synthetic resin. These valves 2 are rotation valves which are connected to (immovably-supported by) the rotary shaft 3, such that the single rotary shaft 3 is inserted into the valves 2. The first intake passages 11 are respectively opened or closed by rotating each valves 2 relative to the duct 1, namely, by varying a rotation angle (open degree) of each valve 2 in an operation range from a fully-open position to a fully-close position. When each valve 2 is at the fully-open position, an opened cross-sectional area of each first intake passage 11 is the largest area. When each valve 2 is in the fully-close position, the opened cross-sectional area of each first intake passage 11 is the smallest area. In this case, each valve 2 throttles the cross-sectional area of each first intake passage 11.

The valves 2 are fully opened by utilizing torque of the electrical actuator, specifically the motor M, when the engine is in normal operation. In this case, the open degrees of the valves 2 are controlled to become a fully-open state (the fully-open position). In other words, the valves 2 are driven in a fully opening direction. The fully-open position of the valves 2 is in a state where each first intake passage 11 defined in the cylindrical parts 10 of the duct 1 is fully opened. The fully-open position is an end position on one side of the operation range of each valve 2, i.e., an opening-side limitation position, where a fully-open stopper part (described later) of the joint 8 bumps into a fully-open stopper (not shown) provided in the duct 1 and a further movement of each valve 2 in the fully opening direction is limited. The joint 8 is coupled to the valves 2 via the rotary shaft 3 to be integrally rotated with the valves 2. The valves 2 may be biased in the fully opening direction by a biasing force such as a spring, so that all the valves 2 are positioned at the fully-open position.

The valves 2 are fully closed by utilizing torque of the electrical actuator, specifically the motor M, when the engine starts or is in idling. In this case, the open degrees of the valves 2 are controlled to become a fully-close state (the fully-close position). In other words, the valves 2 are driven in a fully closing direction. The fully-close position of the valves 2 is in a state where each first intake passage 11 defined in each cylindrical part 10 of the duct 1 is fully closed. The fully-close position is an end position on the other side of the operation range of each valve 2, i.e., an closing-side limitation position, where a fully-close stopper part (described later) of the joint 8 bumps into a fully-close stopper (not shown) provided in the duct 1 and a further movement of each valve 2 in the fully opening direction is limited. The valves 2 may be biased in the fully closing direction by a biasing force such as a spring, so that all the valves 2 are positioned at the fully-close position.

The rotary shaft 3 linearly extends in its rotation axis direction that is parallel to the arrangement direction of the independent intake passages of the cylinders of the engine. The rotary shaft 3 is a polygonal-cross-sectional shaft (e.g., square steel shaft), which is formed such that a sectional surface perpendicular to the rotation axis direction of the rotary shaft 3 has a polygonal shape. For example, the rotary shaft 3 is integrally formed by using iron-based steel. The first and second sliding parts of the rotary shaft 3 have round shapes in sectional surfaces perpendicular to the rotation axis direction of the rotary shaft 3.

The rotary shaft 3 is press-fitted into shaft-fitting holes of the valves 2. The shaft-fitting holes have polygonal shapes in cross-section and are respectively formed in rotational center parts of the valves 2. The single rotary shaft 3 connects the rotational center parts of the valves 2 to each other in a skewer state, such that the valves 2 interlock with each other. Moreover, the rotary shaft 3 varies the opening degrees of the valves 2 and is press-fitted and fixed to wall surfaces of the shaft-fitting holes of the valves 2. Thus, the rotary shaft 3 can support and fix the valves 2.

The first sliding part of the rotary shaft 3 is supported in the first bearing hole 17 of the duct 1 via the oil seal 15 and the bearing 16 of the first bearing member to be able to slide in a rotational direction of the rotary shaft 3. The second sliding part of the rotary shaft 3 is supported in the second bearing hole of the duct 1 via the second bearing member to be able to slide in the rotational direction of the rotary shaft 3. A protrusion part, which projects from the first sliding part of the rotary shaft 3 to one side of the rotary shaft 3 in the rotation axis direction of the rotary shaft 3, is used as an insertion part 18 that is inserted into and supports the joint 8 of the torque transmission mechanism. The insertion part 18 has a polygonal (e.g., quadrangle) shape in a sectional surface perpendicular to the rotation axis direction of the rotary shaft 3.

The electrical actuator includes the motor M, the power transfer mechanism, and an actuator case. The motor M generates a driving force (torque) by receiving supply of electric power to activate the valves 2. The power transfer mechanism transfers the torque of the motor M to the rotary shaft 3. The actuator case accommodates the motor M and the power transfer mechanism, and includes a motor housing 21, a gear housing 22, and a plug 23. The motor housing 21 contains and holds the motor M, and the gear housing 22 accommodates the power transfer mechanism. The plug 23 fills an opening part of the gear housing. The motor housing 21 and the gear housing 22 are integrally formed of synthetic resin with each other.

The motor M is disposed and held in a motor storage space of the motor housing 21. The motor M is electrically connected to a battery (external power source) through a motor drive circuit which is electrically controlled by an engine control unit (e.g., engine control device, electronic control unit: hereinafter ECU). The battery is installed in the vehicle such as an automobile. The power transfer mechanism includes the speed reduction mechanism which reduces the rotational rate of the motor M to a predetermined reduction rate. The speed reduction mechanism includes the worm gear 4, the helical gear 5, the spur gear 6, and the output gear 7. These gears 4 to 7 are rotatably contained in a gear storage space of the gear housing 22.

The worm gear 4 is press-fitted and fixed to a circumferential surface of the motor shaft. The helical gear 5 and the spur gear 6 are rotatably supported by a circumferential surface of a gear shaft 24 which is disposed perpendicular to an axial direction of the motor shaft of the motor M. The spur gear 6 is directly connected to the helical gear 5. Therefore, between the helical gear 5 and spur gear 6, it is unnecessary to provide a first plate, a second plate, and an elastomer, which are separated from each other and are adopted as a conventional impact absorbing member.

The helical gear 5 includes a cylindrical-shaped boss part which surrounds the gear shaft 24 in a circumferential direction of the gear shaft 24. Over an outer periphery of the boss part of the helical gear 5, protrusion teeth, which mesh with the worm gear 4, are formed (arranged) in a circumferential direction of the boss part. The spur gear 6 also includes a boss part which surrounds the gear shaft 24 in the circumferential direction of the gear shaft 24. Over an outer periphery of the boss part of the spur gear 6, protrusion teeth (super gear teeth), which mesh with the output gear 7, are formed (arranged) in a circumferential direction of the boss part of the spur gear 6.

The power transfer mechanism includes the torque transmission mechanism having the output gear 7, the joint 8, and the cushion 9. The output gear 7 and the joint 8 are integrally-molded from synthetic resin individually. The output gear 7 and the joint 8 transmit torque of the motor M from the spur gear 6 or the output gear 7 to the rotary shaft 3 via the cushion 9. The output gear 7 and the joint 8 include a first facing part 31 and a second facing part 32 respectively. The first facing part 31 of the output gear 7 faces the second facing part 32 of the joint 8 across a cushion storage space where the cushion 9 is contained. For example, the cushion storage space is an interspace (space) extending by a predetermined distance (axial distance) parallel to the rotation axis direction of the rotary shaft 3.

The first facing part 31 of the output gear 7 is provided with a facing surface which faces the second facing part 32 of the joint 8 with a predetermined distance (axial distance) therebetween. The second facing part 32 of the joint 8 is provided with a facing surface which faces the first facing part 31 of the output gear 7 with the predetermined distance (axial distance) therebetween. A first cylindrical part 33 is integrally formed with the first facing part 31 at a center part of the facing surface of the first facing part 31. The first cylindrical part 33 projects from the facing surface of the first facing part 31 toward the second facing part 32. Also, a second cylindrical part 34 is integrally formed with the second facing part 32 at a center part of the facing surface of the second facing part 32. The second cylindrical part 34 projects from the facing surface of the second facing part 32 toward the first facing part 31.

The first cylindrical part 33 of the present embodiment has a cylindrical shape to surround the second cylindrical part 34 in a circumferential direction of the second cylindrical part 34. The first facing part 31 and the first cylindrical part 33 are rotatably fitted to an outer periphery of the second cylindrical part 34. A round-shaped insertion hole 35 is defined in the first facing part 31 and the first cylindrical part 33. The second cylindrical part 34 of the joint 8 is rotatably inserted into the insertion hole 35. The second cylindrical part 34 has a function as a pivot which supports the first cylindrical part 33 of the output gear 7 such that the cylindrical part 33 is slidable in a rotational direction of the torque transmission mechanism. A center axis of the second cylindrical part 34 of the joint 8 is identical to a rotational axis of the output gear 7. Accordingly, the output gear 7 is connected the joint 8 to be able to relatively rotate to the joint 8. A press-fitting hole 36 having a polygonal (e.g., quadrangle) shape in cross-section is defined in the second facing part 32 and the second cylindrical part 34. The insertion part 18 of the shaft 3 is press-fitted and fixed into the press-fitting hole 36.

As shown in FIG. 1, the output gear 7 and the joint 8 include plural (e.g., three in the embodiment) first protrusions 41 and plural (e.g., three in the embodiment) second protrusions 42 respectively, which are alternately located in a circumferential direction of the torque transmission mechanism (e.g., the output gear 7 and the joint 8). The first protrusions 41 are radially disposed at a radially outer side of the first cylindrical part 33 to project from the facing surface of the first facing part 31 toward the second facing part 32 in a rotation axis direction of the torque transmission mechanism. The second protrusions 42 are radially disposed at a radially outer side of the second cylindrical part 34 to project from the facing surface of the second facing part 32 toward the first facing part 31 in the rotation axis direction. At least one of the first protrusions 41 may contact (slidably contact) with the second facing part 32 of the joint 8, and an interspace may be defined between the first protrusions 41 and the second facing part 32 of the joint 8. At least one of the second protrusions 42 may contact (slidably contact) with the first facing part 31 of the output gear 7, and an interspace may be defined between the second protrusions 42 and the first facing part 31 of the output gear 7.

A cylindrical-shaped teeth forming part (outer cylindrical part, third cylindrical part) 51 is integrally formed with the output gear 7 on a radially outer side of the first facing part 31 of the output gear 7 to surround the first cylindrical part 33 in a circumferential direction of the first cylindrical part 33. The cushion storage space is defined inside the teeth forming part 51. Over an outer periphery of the teeth forming part 51, protrusion teeth (output gear teeth) 52 are formed (arranged) in a circumferential direction of the teeth forming part 51. The protrusion teeth 52 of the output gear 7 mesh with the protrusion teeth of the spur gear 6. The first facing part 31 of the output gear 7 has an annular shape to close an opening of the teeth forming part 51 on one side (upper side in FIG. 3) of the output gear 7 in an axial direction of the output gear 7.

The first protrusions 41 project radially from an inner circumferential surface of the teeth forming part 51 toward an outer circumferential surface of the first cylindrical part 33, namely, from outer side toward inner side of the cushion storage space in a radial direction of the output gear 7. The first protrusions 41 project from a bottom surface (down end surface in FIG. 3) of the first facing part 31 toward the other side (down side in FIG. 3) in the axial direction of the output gear 7. The first protrusions 41 are disposed at predetermined intervals (in certain intervals: e.g., 120° intervals) in the circumferential direction of the torque transmission mechanism. The first protrusions 41 are respectively inserted and located between adjacent two of the second protrusions 42 in the circumferential direction.

The joint 8 is integrally formed with a base plate 61, a sleeve 62, and a flange 63. On a surface (upper end surface in FIG. 3) of the base plate 61, the round-shaped second facing part 32 is disposed. The sleeve 62 projects from a rear surface (down end surface in FIG. 3) of the base plate 61 toward a valve side (i.e., the side opposite to a projection direction of the second cylindrical part 34). The flange 63 having a sword-guard-like shape is formed at an outer periphery of the base plate 61. The second cylindrical part 34 and the sleeve 62 form a part of a cylindrical-shaped wall portion which extends in the rotation axis direction of the rotary shaft 3 and surrounds the insertion part 18 of the rotary shaft 3 in a circumferential direction of the insertion part 18. The second cylindrical part 34 is formed on the second facing part 32.

Figure 3:
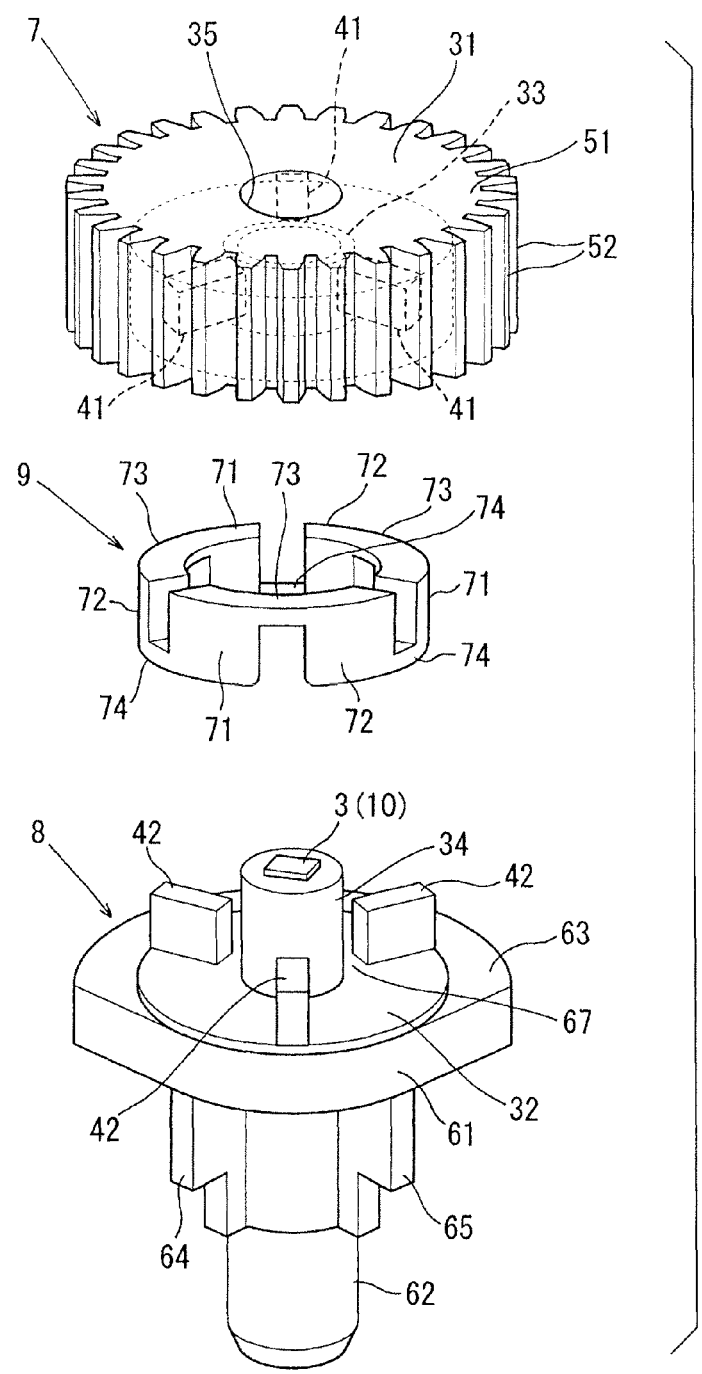
FIG. 3 is a disassembled perspective view showing a part of the torque transmission mechanism according to the first embodiment.
Figure 4:
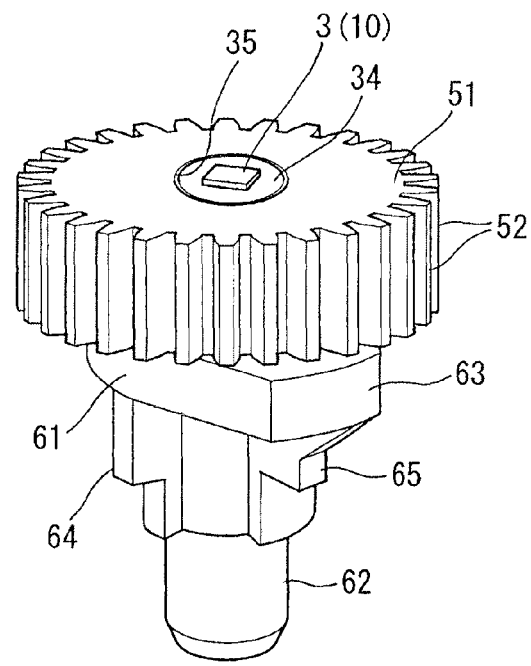
FIG. 4 is an assembled perspective view showing the part of the torque transmission mechanism, shown in FIG. 3, according to the first embodiment.
Figure 5:
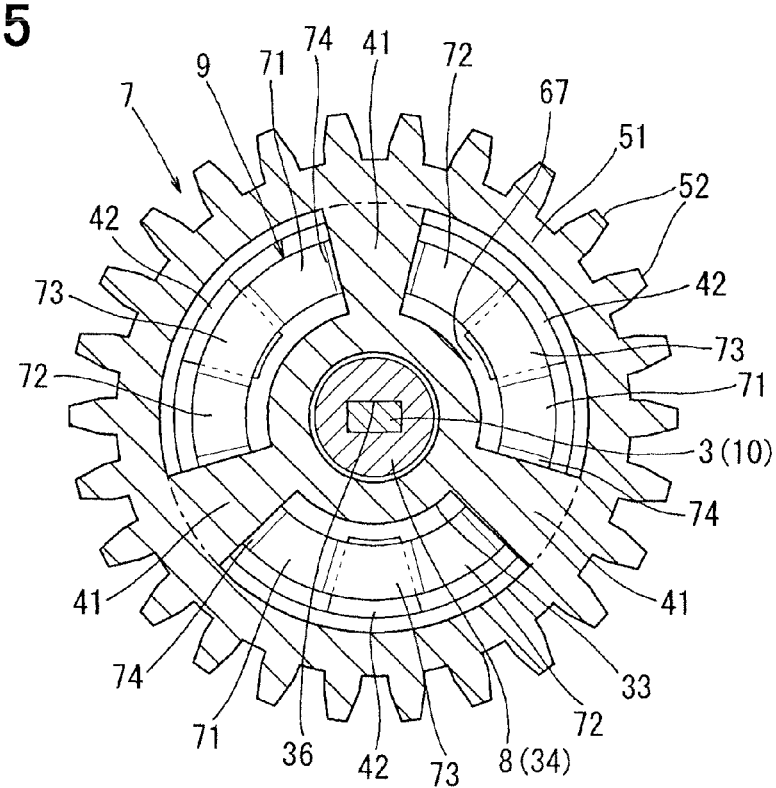
FIG. 5 is a sectional view showing a part of the torque transmission mechanism according to the first embodiment.

The press-fitting hole 36 having a polygonal shape in cross-section is defined in the sleeve 62, similar to the second facing part 32 and the second cylindrical part 34. The insertion part 18 of the shaft 3 is press-fitted and fixed to the press-fitting hole 36. Thus, the joint 8 is connected to the rotary shaft 3 to be able to rotate with the rotary shaft 3 simultaneously, not relatively. The press-fitting hole 36 is provided on a rotation axis of the joint 8 and is extended in the rotation axis direction of the rotary shaft 3. Both sides of the press-fitting hole 36 in the rotation axis direction open. Therefore, as shown in FIG. 3, the press-fitting hole 36 extends through the joint 8 in the rotation axis direction of the rotary shaft 3 such that an opening at an upper end surface of the second cylindrical part 34 and an opening at a down end surface of the sleeve 62 communicate with each other through the press-fitting hole 36.

On an outer periphery of the sleeve 62, a protrusion line part 64 and a protrusion line part 65 are integrally formed with the sleeve 62. The protrusion line parts 64 and 65 project radially outward from the sleeve 62. One of the protrusion line parts 64 and 65 may have a function as the fully-close stopper part which is engaged with the fully-close stopper of the duct 1 when the valves 2 are fully closed. The other one of the protrusion line parts 64 and 65 may have a function as the fully-open stopper part which is engaged with the fully-open stopper of the duct 1 when the valves 2 are fully opened.

The second protrusions 42 project from a surface (upper end surface in FIG. 3) of the second facing part 32 toward the one side (upper side in FIG. 3) in the axial direction of the output gear 7. The second protrusions 42 are disposed at predetermined intervals (in certain intervals: e.g., 120° intervals) in the circumferential direction of the torque transmission mechanism. The second protrusions 42 are respectively inserted and arranged between neighboring two of the first protrusions 41. An annular-shaped insertion recessed part 67 is formed between an outer circumferential surface of the second cylindrical part 34 of the joint 8 and inner surfaces of the second protrusions 42 in a radial direction of the joint 8. The first cylindrical part 33 of the output gear 7 is inserted into the insertion recessed part 67.

For example, the cushion 9 may be composed only of an elastomer which is integrally formed of synthetic rubber (Hydrogenated Nitrile Butadiene Rubber: H-NBR) or the like. The cushion 9 is used as the impact absorbing member which absorbs an impact load transmitting to the output gear 7 or the joint 8. The cushion 9 includes compressive deformation parts 71 and 72, first connection parts 73, and second connection parts 74. As shown in FIGS. 1 and 3, each compressive deformation part 71 is located between one side of the first protrusion 41 and the other side of the second protrusion 42 in the circumferential direction of the torque transmission mechanism. Each compressive deformation part 72 is located between the other side of the first protrusion 41 and the one side of the second protrusion 42 in the circumferential direction. The first connection parts 73 are located on one side (upper side in FIG. 3) of the second protrusions 42 in the rotation axis direction of the torque transmission mechanism and respectively connect the adjacent compressive deformation parts 71 and 72. The second connection parts 74 are located on the other side (down side in FIG. 3) of the first protrusions 41 in the rotation axis direction and respectively connect the adjacent compressive deformation parts 71 and 72.

As shown in FIG. 1, the compressive deformation parts 71 are rubber elastic bodies which can be compressed and deformed in the circumferential direction of the torque transmission mechanism (rotation direction of the rotary shaft 3). Each of the compressive deformation parts 71 is inserted and located between adjacent first and second protrusions 41 and 42 in the circumferential direction. Furthermore, the compressive deformation parts 71 are held between the first facing part 31 of the output gear 7 and the second facing part 32 of the joint 8 to be elastically deformable. As shown in FIG. 1, the compressive deformation parts 72 are rubber elastic bodies which can be compressed and deformed in the circumferential direction of the torque transmission mechanism (rotation direction of the rotary shaft 3). Each of the compressive deformation parts 72 is inserted and located between adjacent first protrusions 41 and 42 in the circumferential direction. The compressive deformation parts 72 are held between the first facing part 31 of the output gear 7 and the second facing part 32 of the joint 8 to be elastically deformable. The compressive deformation part 71 is located at the one side of the first protrusion 41 in the circumferential direction, and the compressive deformation part 72 is located at the other side of the first protrusion 41 in the circumferential direction.

Each of the first connection parts 73 is a bridge which is located on the one side of the second protrusion 42 in the rotation axis direction of the torque transmission mechanism and connects one side end parts (upper end parts in FIG. 3) of adjacent compressive deformation parts 71 and 72 in the rotation axis direction to each other. Similar to the compressive deformation parts 71 and 72, the first connection parts 73 also is compressively deformable in the circumferential direction of the torque transmission mechanism. Each of second connection parts 74 is a bridge which is located on the other side of the first protrusion 41 in the rotation axis direction and connects the other side end parts (down end parts in FIG. 3) of adjacent compressive deformation parts 71 and 72 in the rotation axis direction to each other. The second connection parts 74 also compressively deformable in the circumferential direction, similar to the compressive deformation parts 71 and 72 and the first connection part 73.

Operation of the vortex flow generating device according to the present embodiment will be described based on FIGS. 1 to 5. The ECU controls electricity supplied to the motor M (e.g., energizes the motor M) when the engine starts or is in idling. When the motor M is energized, the rotary shaft 3 is driven to a closing operation direction by utilizing torque of the motor M. Hence, the valves 2 are closed, i.e., the first intake passages 11 are fully closed by closing the valves 2.

If the valves 2 are closed, intake air flowing into the duct 1 from the throttle body or the surge tank passes through the second intake passages 12 and belches from an inside of the duct 1 (the second intake passages 12) into the intake ports. Then, straight flows (lopsided flows) are generated and the lopsided flows in the intake ports are supplied to the combustion chambers through openings of the intake ports. At this time, intake vortex flows are generated in the combustion chambers of the cylinders of the engine. Thus, combustion efficiency in the combustion chambers is improved when the engine starts or is in idling. Accordingly, for example, fuel efficiency and emission reducsion (e.g., Hydrocarbon reduction effect) are enhanced.

When transmission of torque is impulsively operated, namely, when one of the two protrusion line parts 64 and 65 bumps into the fully-close stopper, the compressive deformation parts 71 and 72 of the cushion 9 are compressively deformed. The protrusion line parts 64 and 65 are formed integrally with the joint 8 which is integrally and rotatably coupled with the rotary shaft 3 and the valves 2. Hence, the impulsive load transmitting to the worm gear 4 fixed to the output shaft (motor shaft) of the motor M can be absorbed by the cushion 9. Therefore, occurrence of a screw tightening state (worm lock) of the worm gear 4 is prevented.

While the motor M is working, the compressive deformation parts 71 and 72 of the cushion 9 are compressed and deformed by the torque of the motor M. Thus, because of a reactive force from the cushion 9, backlashes between the worm gear 4 and the helical gear 5 and between the spur gear 6 and the output gear 7 can be filled. Accordingly, the vortex flow generating device has a self-locking effect of the worm gear 4, which works when the motor M is stopped, and flap of the valves 2 is prevented regardless of whether the motor M is working.

When abnormal pressure such as backfire pressure is occurred, the joint 8 may be separated from the output gear 7, which meshes with the spur gear 6, because the compressive deformation parts 71 and 72 of the cushion 9 are deflected to resist the abnormal pressure on the valves 2. Hence, the valves 2 which interlock with the rotary shaft 3 can be rotated from the fully-close state toward the fully-open state depending on an abnormal load on the valves 2 in the fully-close state, namely, depending on an impulsive load of the abnormal pressure. Accordingly, even when the valves 2 are subjected to the abnormal pressure such as the backfire pressure, a part of the vortex flow generating device can be not damaged and intake vortex flows can be generated in the combustion chambers.

Effects of the first embodiment will be described below. The electrical actuator which drives the valves 2 includes the motor M as a power source, the speed reduction mechanism which reduces a rotational rate of the motor M, and the torque transmission mechanism which transmits torque of the motor M to the rotary shaft 3 from the output gear 7 of the speed reduction mechanism. The torque transmission mechanism includes the output gear 7 made of synthetic resin, the joint 8 made of synthetic resin, and the cushion 9 made of synthetic rubber.

The first protrusions 41 project from the facing surface of the first facing part 31 of the output gear 7 toward the second facing part 32 of the joint 8. The second protrusions 42 project from the facing surface of the second facing part 32 of the joint 8 toward the first facing part 31 of the output gear 7. The first and second protrusions 41 and 42 are alternately located in the circumferential direction of the torque transmission mechanism. The first protrusions 41 are located at predetermined intervals (in certain intervals: e.g., 120° intervals) in the circumferential direction of the torque transmission mechanism. The second protrusions 42 are also located at the predetermined intervals in the circumferential direction. Accordingly, deformation amounts of the compressive deformation parts 71 are equal to those of the compressive deformation parts 72.

The cushion 9, which is held between the output gear 7 and the joint 8, is integrally formed with the compressive deformation parts 71 and 72, which are compressively deformable in the circumferential direction of the torque transmission mechanism. The compressive deformation parts 71 are respectively inserted and located between the one side of the first protrusions 41 and the other side of the second protrusions 42 in the circumferential direction of the torque transmission mechanism, so that the compressive deformation parts 71 are held to be elastically deformable. The compressive deformation parts 72 are respectively inserted and located between the other side of the first protrusions 41 and the one side of the second protrusions 42 in the circumferential direction, so that the compressive deformation parts 72 are held to be elastically deformable.

The cushion 9 is integrally formed also with the first connection parts 73 and the second connection parts 74. Each of the first connection parts 73 is located on the one side (upper side in FIG. 3) of the second protrusion 42 in the rotation axis direction of the torque transmission mechanism and connects adjacent compressive deformation parts 71 and 72. Each of the second connection parts 74 is located on the other side (down side in FIG. 3) of the first protrusion 41 in the rotation axis direction and connects adjacent compressive deformation parts 71 and 72. Thus, all the compressive deformation parts 71 and 72 are connected with each other by the first and second connection parts 73 and 74. Hence, the compressive deformation parts 71 and 72 can be integrated into the single cushion 9 (integrated component). Therefore, the number of components and assembly man-hours can be reduced. As a result, production cost can be decreased.

In the electrical actuator of the present embodiment, a holding (installing) position of the cushion 9 is moved at a position between the output gear 7 and the joint 8. Thus, the cushion 9 is located near the valves 2 more than the output gear 7 which functions as the last gear of the speed reduction mechanism. The cushion 9 can be used to have an impact absorbing performance of a coil spring of the conventional technology. In the conventional technology, the coil spring is located between an output gear and a shaft, and deflected to resist the impulsive load of abnormal pressure such as backfire pressure, thereby preventing breakage of a valve can be excluded. Accordingly, in the present embodiment, the number of components and assembly man-hours can be reduced, and production cost can be decreased, as compared with the conventional technology.

Figure 10A:
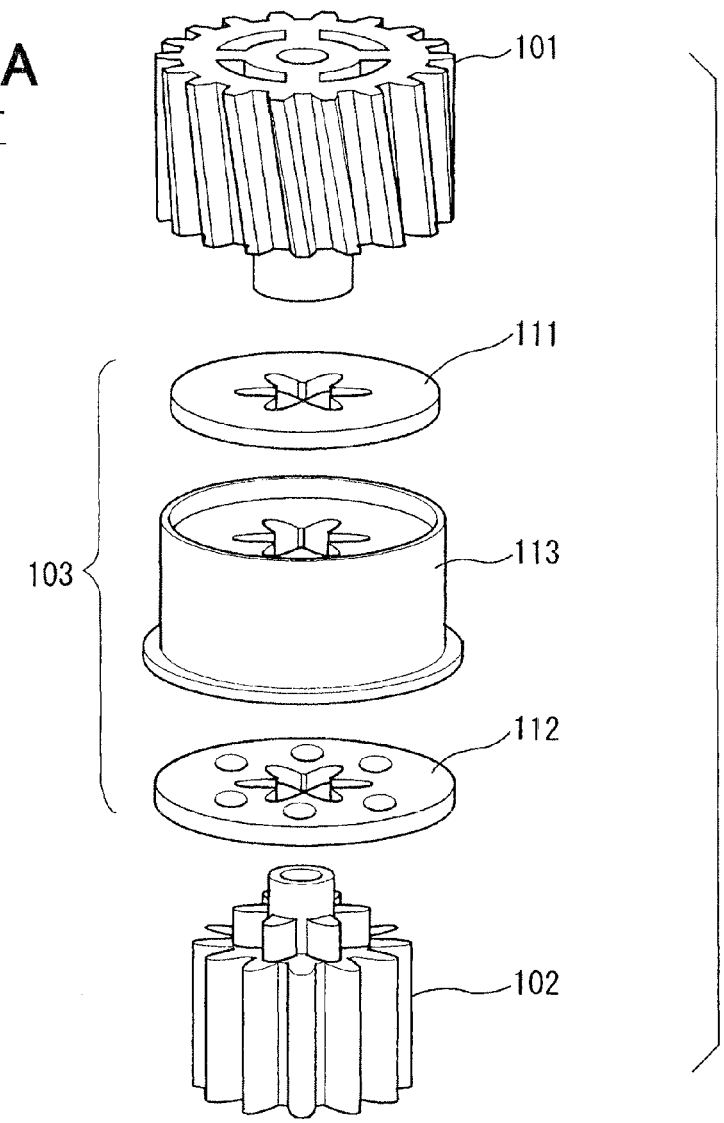
FIG. 10A is a disassembled perspective view showing a part of a speed reduction mechanism according to a conventional technology.
Figure 10B:
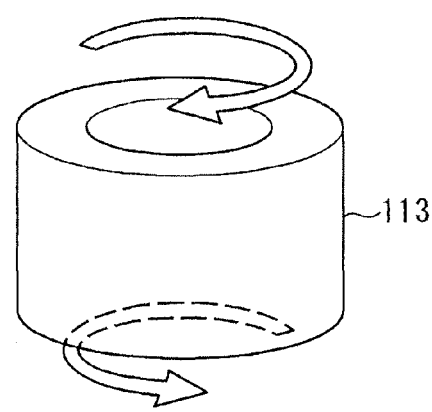
FIG. 10B is a schematic perspective view showing a rubber elastomer of an impact absorbing member in FIG. 10A.

A deformation mode of each compressive deformation parts 71 and 72 of the cushion 9 is changed from a twist deformation mode shown in FIG. 10B to a compressive deformation mode in the circumferential direction of the torque transmission mechanism shown in FIG. 1. Generally, torque transmitting to the rotary shaft 3 from the motor M is increased with increase of a gear ratio of the cushion 9 to a rubber elastomer, and a rotational rate of the shaft 3 is divided by the gear ratio. Thus, in the present embodiment, an impulsive load transmitting to the output gear 7 or the joint 8 can be effectively absorbed by the compressive deformation of each compressive deformation parts 71 and 72 of the cushion 9, even when a deformation amount of the compressive deformation is smaller than a deformation amount of the conventional twist deformation.

A necessary deformation amount of each compressive deformation parts 71 and 72 of the cushion 9 for maintaining an impact absorbing performance of the twist deformation can be decreased because the cushion 9 is located near the valves 2 more than the output gear 7 of the speed reduction mechanism. Therefore, a sufficient impact absorbing performance can be maintained in the cushion 9 of the present embodiment even when the deformation mode is changed from the twist deformation mode to the compressive deformation mode in the circumferential direction of the torque transmission mechanism.

In the vortex generating device of the present embodiment, the cushion 9 is held between the first facing part 31 of the output gear 7 and the second facing part 32 of the joint 8, and the compressive deformation parts 71 and 72 of the cushion 9 are respectively inserted and located between the first protrusions 41 and the second protrusions 42 which are adjacent to the first protrusions 41. Accordingly, the compressive deformation parts 71 and 72 of the cushion 9 can be compressed and deformed in the circumferential direction of the torque transmission mechanism without bonding (e.g., vulcanized bonding) of the deformation parts 71 and 72 of the cushion 9 to the adjacent first and second protrusions 41 and 42. Thus, the impact absorbing performance does not decrease. Hence, adhesions between the compressive deformation parts 71 and 72 of the cushion 9 and the first and second protrusion 41 and 42 can be excluded. Therefore, operation reliability of the cushion 9 can be improved. Furthermore, because the cushion 9 is formed only of an elastomer (rubber cushion), the number of components and assembly man-hours can be reduced. As a result, production cost can be decreased.

Second Embodiment

Figure 6:
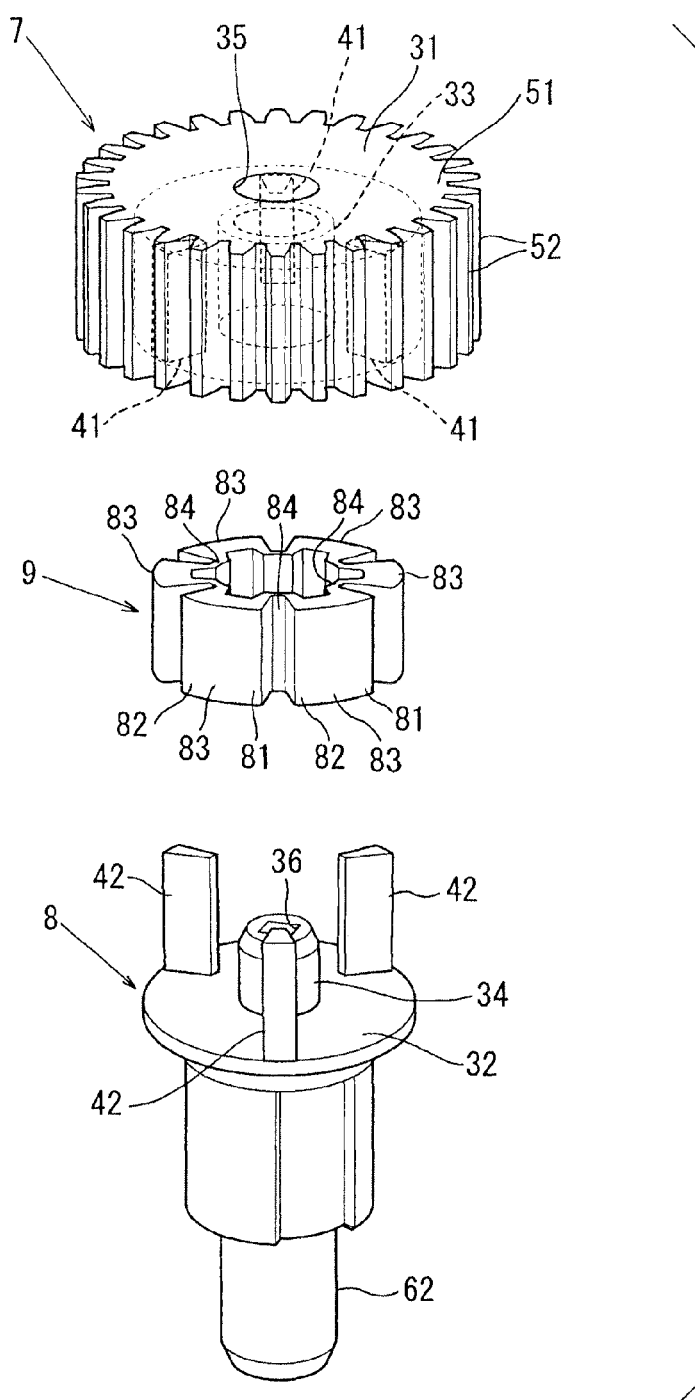
FIG. 6 is a disassembled perspective view showing a part of a torque transmission mechanism according to a second embodiment of the invention.

A second embodiment of the invention will be described with reference to FIGS. 2 and 6. A vortex flow generating device according to the second embodiment includes a duct (intake manifold) 1, at least one valve 2, a shaft 3, and an electrical actuator. The duct 1 includes a bulkhead 13 which separates an inner space of the duct 1 (an independent intake passage of an engine) into a first intake passage 11 and a second intake passage 12 in a flow direction of air. The first intake passage 11 is opened and closed by opening and closing the valve 2. The shaft 3 supports and fixes the valve 2, and the electrical actuator causes the valve 2 to be opened and closed. The electrical actuator includes a motor M as a power source, a speed reduction mechanism which reduces a rotational rate of the motor M, and a torque transmission mechanism which transmits torque of the motor M to the shaft 3 from the speed transmission mechanism.

The torque transmission mechanism includes an output gear 7, a joint 8, and a cushion 9. The output gear 7 is made of synthetic resin and includes protrusion teeth 52 which mesh with protrusion teeth of a spur gear 6 of the speed reduction mechanism. The joint 8 is made of synthetic resin and is fitted on a circumferential surface of an insertion part 18 which is an end part of the shaft 3 on its one side in a rotation axis direction of the shaft 3. The cushion 9 is made of synthetic rubber (elastomer) and is held between a first facing part 31 of the output gear 7 and a second facing part 32 of the joint 8. The output gear 7 includes the first facing part 31, a first cylindrical part 33, multiple (e.g., three in the embodiment) first protrusions 41, and a teeth forming part 51. The joint 8 includes the second facing part 32, a second cylindrical part 34, multiple (e.g., three in the embodiment) second protrusions 42, and a sleeve 62.

The first facing part 31 and the first cylindrical part 33 of the output gear 7 define an insertion hole 35, into which the second cylindrical part 34 of the joint 8 is inserted to be slidable in a rotational direction of the torque transmission mechanism. The second cylindrical part 34 of the joint 8 functions as a pivot supporting the first cylindrical part 33 of the output gear 7 such that the first cylindrical part 33 is slidable in the rotational direction of the torque transmission mechanism. The second facing part 32 and the second cylindrical part 34 are provided with a press-fitting hole 36 into which the insertion part 18 of the shaft 3 is press-fitted. As shown in FIG. 6, in the second embodiment, a projection amount of the second cylindrical part 34 from a facing surface of the second facing part 32 is relatively smaller than that of the second protrusions 42. Other parts of the joint 8 of the second embodiment may have the same structures to the first embodiment.

Similar to the first embodiment, the first protrusions 41 are disposed at predetermined intervals (certain intervals: e.g., 120° intervals) in a circumferential direction of the torque transmission mechanism. The second protrusions 42 are also disposed at the predetermined intervals in the circumferential direction of the torque transmission mechanism. These first and second protrusions 41 and 42 are alternately located in the circumferential direction of the torque transmission mechanism. The first protrusions 41 project from a facing surface of the first facing part 31 of the output gear 7 toward the second facing part 32. The second protrusions 42 project from the facing surface of the second facing part 32 of the joint 8 toward the first facing part 31.

The cushion 9 includes a plurality of compressive deformation parts 81 and 82, first connection parts 83, and second connection parts 84. First and second compressive deformation parts 81 and 82 (plural compressive deformation parts) are located between adjacent first and second protrusions 41 and 42 adjacent to each other in the circumferential direction of the torque transmission mechanism. Each first connection part 83 is located between a pair of adjacent first and second compressive deformation parts 81 and 82, and connects the pair of first and second compressive deformation parts 81 and 82. Each second connection part 84 is located radially inside the first and second protrusions 41 and 42, and connects another pair of adjacent second and first compressive deformation parts 82 and 81. Similar to the compressive deformation parts 71 of the first embodiment, the first compressive deformation parts 81 are made of a synthetic rubber which is compressively deformable in the circumferential direction. Similar to the compressive deformation parts 72 of the first embodiment, the second compressive deformation parts 82 are made of a synthetic rubber which is compressively deformable in the circumferential direction.

The first connection parts 83 are bridges which respectively connect outer circumferential parts (radially outer end parts) of the adjacent first and second compressive deformation parts 81 and 82 to each other. The first connection parts 83 are also compressively deformable in the circumferential direction of the torque transmission mechanism, similar to the compressive deformation parts 81 and 82. The second connection parts 84 are bridges which respectively connect inner circumferential parts (radially inner end parts) of the adjacent second and first compressive deformation parts 82 and 81 to each other. The second connection parts 84 are also compressively deformable in the circumferential direction, similar to the compressive deformation parts 81 and 82 and the first connection parts 83. The first connection parts 83 and the second connection parts 84 are alternatively arranged in the circumferential direction. In the second embodiment, the other parts may be similar to those of the above-described first embodiment.

Third Embodiment

Figure 7:
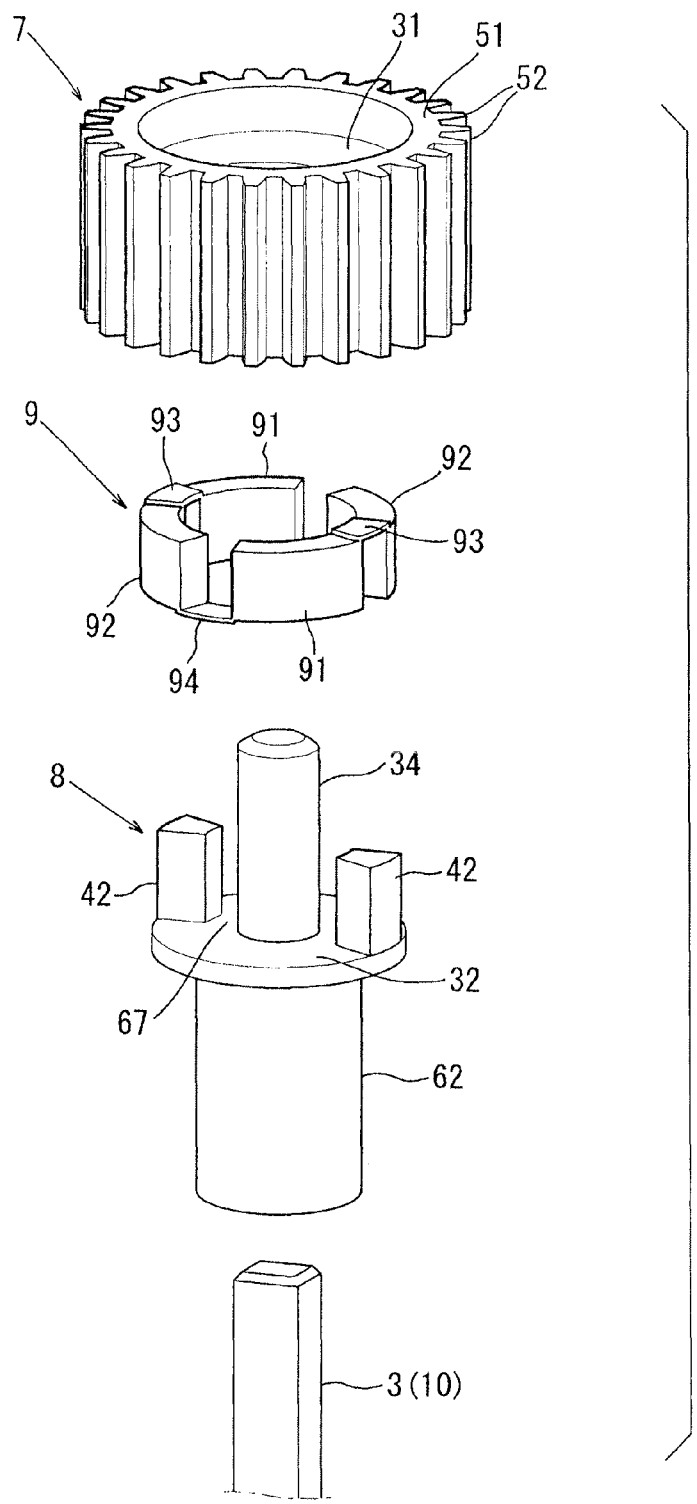
FIG. 7 is a disassembled perspective view showing a part of a torque transmission mechanism according to a third embodiment of the invention.
Figure 8:
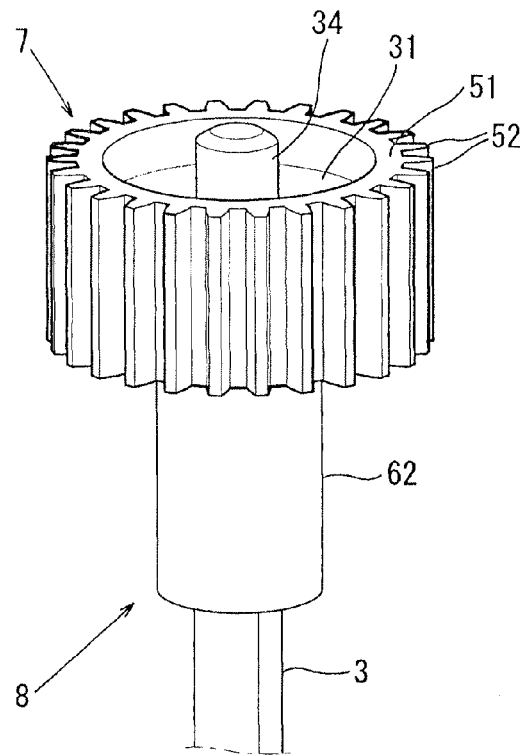
FIG. 8 is an assembled perspective view showing a part of the torque transmission mechanism according to the third embodiment.
Figure 9:
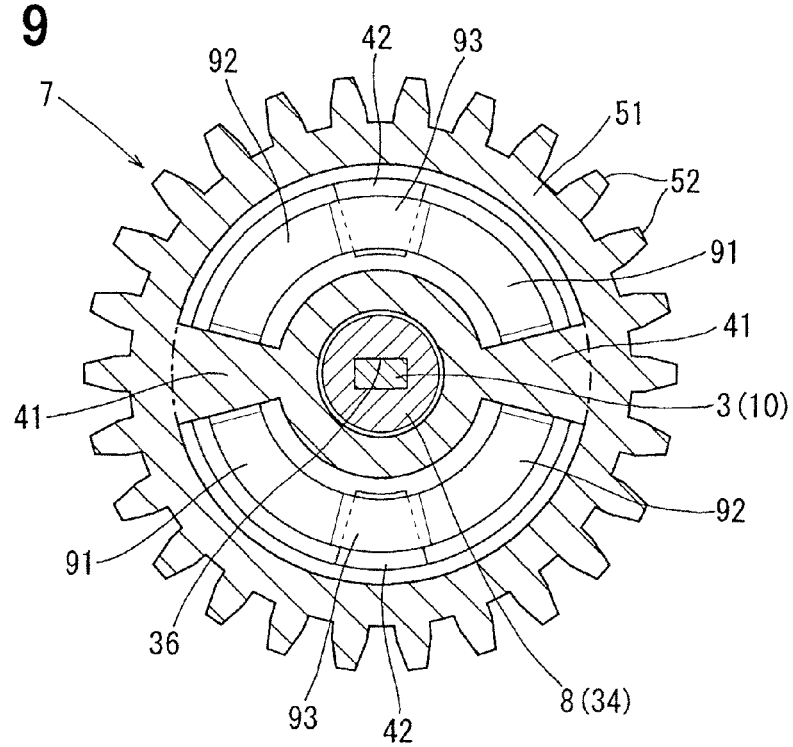
FIG. 9 is a sectional view showing a part of the torque transmission mechanism according to the third embodiment.

A third embodiment of the invention will be described in reference to FIGS. 7 to 9. In the third embodiment, an output gear 7 and a joint 8 include two first protrusions 41 and two second protrusions 42 respectively. The first and second protrusions 41 and 42 are alternately located in a circumferential direction of a torque transmission mechanism. The first protrusions 41 are disposed at predetermined intervals (certain intervals: e.g., 180° intervals) in the circumferential direction of the torque transmission mechanism. The second protrusions 42 are also disposed at the predetermined intervals in the circumferential direction. A cushion 9 includes compressive deformation parts 91 and 92, first connection parts 93, and second connection parts 94. Each compressive deformation part 91 is located between one side of the first protrusion 41 and the other side of the second protrusion 42 in the circumferential direction. Each compressive deformation part 92 is located between the other side of the first protrusion 41 and the one side of the second protrusion 42 in the circumferential direction. Each first connection part 93 is located on one side (upper side in FIG. 7) of the second protrusion 42 in a rotation axis direction of the torque transmission mechanism, and connects the adjacent compressive deformation parts 91 and 92 to each other. Each second connection part 94 is located on the other side of the first protrusions 41 in the rotation axis direction of the torque transmission mechanism, and connects the adjacent compressive deformation parts 91 and 92 to each other.

The compressive deformation parts 91 are made of a synthetic rubber which is compressively deformable in the circumferential direction of the torque transmission mechanism (in a radial direction of a center axis of the shaft 3). These compressive deformation parts 91 are respectively inserted and located between the one side of the first protrusions 41 and the other side of the second protrusions 42 in the circumferential direction. The compressive deformation parts 91 are further held between the first facing part 31 of the output gear 7 and the second facing part 32 of the joint 8 to be elastically deformable. The compressive deformation parts 92 are made of a synthetic rubber which is compressively deformable in the circumferential direction. These compressive deformation parts 92 are respectively inserted and located between the other side of the first protrusions 41 and the one side of the second protrusions 42 in the circumferential direction. The compressive deformation parts 92 are further held between the first facing part 31 of the output gear 7 and the second facing part 32 of the joint 8 to be elastically deformable.

The first connection parts 93 are bridges which respectively connect one side end parts (upper side end parts in FIG. 7) of the adjacent compressive deformation parts 91 and 92 in the rotation axis direction of the torque transmission mechanism to each other. Similar to the compressive deformation parts 91 and 92, the first connection parts 93 are also compressively deformable in the circumferential direction of the torque transmission mechanism. The second connection parts 94 are bridges which respectively connect the other side end parts (down side end parts in FIG. 7) of the adjacent compressive deformation parts 91 and 92 in the rotation axis direction to each other. The second connection parts 94 are also compressively deformable in the circumferential direction, similar to the compressive deformation parts 91 and 92 and the first connection parts 93.

(Modification)

In the above-described embodiments, the intake device of the invention for the internal combustion engine is applied to a vortex flow generating device. However, the intake device of the invention may be applied to an electronic throttle device (a throttle device of an internal combustion engine) or a variable intake device which changes a length or/and an area of an intake passage of an internal combustion engine. In the above-described embodiments, the duct 1 (intake manifold) is adopted as a casing. However, a throttle body, an engine head cover, or a cylinder head may be adopted as the casing.

In the above-described embodiments, the output gear 7 is the last gear of the speed reduction mechanism and is adopted as a gear or a first connection member which is integrally and rotatably connected to the gear. However, a component, which is located on a driving side of the torque transmission mechanism and connected to the last gear of the speed reduction mechanism to be integrally rotatable with the last gear, can be adopted as the gear or the first connection member. In the above-described embodiments, the joint 8 (a component on a driven side of the torque transmission mechanism, a second connection member) is adopted as a shaft or a second connection member which is integrally and rotatably connected to the shaft. However, the rotary shaft 3 of the valve 2 can be adopted as the shaft or the second connection member.

Additional advantages and modifications will readily occur to those skilled in the art. The invention in its broader terms is therefore not limited to the specific details, representative apparatus, and illustrative examples shown and described.

What is claimed is:

1. An intake device for an internal combustion engine, comprising:
a casing defining an intake passage communicating with a combustion chamber of the internal combustion engine;
a valve rotatably contained in the casing to open or close the intake passage;
a shaft supporting the valve; and
an actuator including:
a motor as a power source,
a speed reduction mechanism which reduces a rotational rate of the motor and includes a worm gear fixed to a motor shaft of the motor, a helical gear meshing with the worm gear, and a spur gear disposed coaxially with the helical gear and an output gear meshing with the spur gear, and a transmission mechanism which transmits torque of the motor to the shaft from the output gear of the speed reduction mechanism, wherein the transmission mechanism includes a first connection member which is integrally and rotatably connected to the output gear, a second connection member which is integrally and rotatably connected to the shaft, and an impact absorbing member held between the first connection member and the second connection member, the first connection member includes a plurality of first protrusions, the second connection member includes a plurality of second protrusions, and the first protrusions and the second protrusions are alternately arranged in a rotational direction of the transmission mechanism, and the impact absorbing member includes a plurality of compressive deformation parts which are compressively deformable in the rotational direction of the transmission mechanism and are respectively inserted and located between the first and second protrusions that are adjacent to each other in the rotational direction.

2. The intake device for an internal combustion engine according to claim 1, wherein the impact absorbing member is made only of an elastomer.

3. The intake device for an internal combustion engine according to claim 1, wherein the impact absorbing member includes a connection part which connects two of the compressive deformation parts that are adjacent to each other in the rotational direction.

4. The intake device for an internal combustion engine according to claim 1, wherein at least one of the first protrusions slidably contacts with the second connection member, and at least one of the second protrusions slidably contacts with the first connection member.

5. The intake device for an internal combustion engine according to claim 1, wherein the first protrusions are arranged at predetermined intervals in a rotational direction of the first connection member, and the second protrusions are arranged at predetermined intervals in a rotational direction of the second connection member.

6. The intake device for an internal combustion engine according to claim 1, wherein the first connection member includes a first facing part, and the second connection member includes a second facing part that is opposite to the first facing part such that there is a predetermined space therebetween, and the first protrusions project from the first facing part toward the second facing part, and the second protrusions project from the second facing part toward the first facing part.

7. The intake device for an internal combustion engine according to claim 1, wherein the first connection member includes a cylindrical part defining a containing space containing the impact absorbing member, and the first protrusions project radially inward from an inner circumferential surface of the cylindrical part.

8. The intake device for an internal combustion engine according to claim 1, wherein the shaft includes an insertion part having a polygonal shape in a sectional surface perpendicular to a rotation axis direction of the shaft, and the second connection member defines a press-fitting hole having a polygonal shape in cross-section, into which the insertion part is press-fitted.

9. The intake device for an internal combustion engine according to claim 1, wherein the second connection member includes a pivot rotatably supporting the first connection member.

10. The intake device for an internal combustion engine according to claim 1, wherein the helical gear and the spur gear are rotatably supported by a circumferential surface of a gear shaft which is disposed perpendicular to an axial direction of the motor shaft, and the spur gear is directly connected to the helical gear.

11. An intake device for an internal combustion engine, comprising:

a casing defining an intake passage communicating with a combustion chamber of the internal combustion engine;

a valve rotatably contained in the casing to open or close the intake passage;

a shaft supporting the valve;

an actuator including:
a motor as a power source,
a speed reduction mechanism which reduces a rotational rate of the motor and includes a worm gear fixed to a motor shaft of the motor, a helical gear meshing with the worm gear, a spur gear disposed coaxially with the helical gear and an output gear meshing with the spur gear, and a transmission mechanism which transmits torque of the motor to the shaft from the output gear of the speed reduction mechanism, wherein the transmission mechanism is configured to have the output gear, a rotation member of the shaft, and an impact absorbing member held between the output gear and the rotation member, the output gear includes a plurality of first protrusions, the rotation member includes a plurality of second protrusions, and the first protrusions and the second protrusions are alternately arranged in a rotational direction of the transmission mechanism, and the impact absorbing member includes a plurality of compressive deformation parts which are compressively deformable in the rotational direction of the transmission mechanism and are respectively inserted and located between the first and second protrusions that are adjacent to each other in the rotational direction.

12. The intake device for an internal combustion engine according to claim 11, wherein the impact absorbing member is made only of an elastomer.

13. The intake device for an internal combustion engine according to claim 11, wherein the impact absorbing member includes a connection part which connects two of the compressive deformation parts that are adjacent to each other in the rotational direction.

14. The intake device for an internal combustion engine according to claim 11, wherein at least one of the first protrusions slidably contacts with the rotation member, and at least one of the second protrusions slidably contacts with the gear.

15. The intake device for an internal combustion engine according to claim 11, wherein the first protrusions are arranged at predetermined intervals in a rotational direction of the gear, and the second protrusions are arranged at predetermined intervals in a rotational direction of the rotation member.

16. The intake device for an internal combustion engine according to claim 11, wherein the gear includes a first facing part, and the rotation member includes a second facing part that is opposite to the first facing part such that there is a predetermined space therebetween, and the first protrusions project from the first facing part toward the second facing part, and the second protrusions project from the second facing part toward the first facing part.

17. The intake device for an internal combustion engine according to claim 11, wherein the gear includes a cylindrical part defining a containing space containing the impact absorbing member, and the first protrusions project radially inward from an inner circumferential surface of the cylindrical part.

18. The intake device for an internal combustion engine according to claim 11, wherein the shaft includes an insertion part having a polygonal shape in a sectional surface perpendicular to a rotation axis direction of the shaft, and the rotation member defines a press-fitting hole having a polygonal shape in cross-section, into which the insertion part is press-fitted.

19. The intake device for an internal combustion engine according to claim 11, wherein the rotation member includes a pivot rotatably supporting the gear.

20. The intake device for an internal combustion engine according to claim 11, wherein the helical gear and the spur gear are rotatably supported by a circumferential surface of a gear shaft which is disposed perpendicular to an axial direction of the motor shaft, and the spur gear is directly connected to the helical gear.

* * * * *